United States Patent
Motsch et al.

(10) Patent No.: US 9,520,150 B2
(45) Date of Patent: Dec. 13, 2016

(54) FLEXIBLE PACKAGE AND METHOD OF MAKING SAME

(71) Applicant: The Procter & Gamble Company, Cincinnati, OH (US)

(72) Inventors: Andreas Peter Motsch, Schwalbach am Taunus (DE); Oliver Heilmann, Schwalbach am Taunus (DE); Christoph Wolfgang Siegfried Beck, Schwalbach am Taunus (DE); Lucio Frias, Madeira, OH (US); Sarah Ann Lavash, Cincinnati, OH (US); Thomas Rethschulte, Lengerich (DE); Rudolph Haimerl, Lengerich (DE); Alfons Stahl, Lengerich (DE)

(73) Assignee: The Procter & Gambel Company, Cincinnati, OH (US)

( * ) Notice: Subject to any disclaimer, the term of this patent is extended or adjusted under 35 U.S.C. 154(b) by 101 days.

(21) Appl. No.: 13/948,439

(22) Filed: Jul. 23, 2013

(65) Prior Publication Data
US 2014/0029871 A1    Jan. 30, 2014

Related U.S. Application Data

(60) Provisional application No. 61/676,381, filed on Jul. 27, 2012.

(51) Int. Cl.
| | | |
|---|---|---|
| *G11B 5/00* | (2006.01) | |
| *G11B 5/60* | (2006.01) | |
| *B65D 77/22* | (2006.01) | |

(52) U.S. Cl.
CPC ............. *G11B 5/6088* (2013.01); *B65D 77/22* (2013.01)

(58) Field of Classification Search
CPC ..... B65D 33/10; B65D 75/5833; B65D 85/16; B65D 33/065; B65D 33/08; B65D 77/22; G11B 5/6088
USPC ........................................ 383/6, 7, 200, 207
See application file for complete search history.

(56) References Cited

U.S. PATENT DOCUMENTS

| | | | | |
|---|---|---|---|---|
| 3,282,493 | A | * | 11/1966 | Kamins et al. ............... 383/203 |
| 4,539,705 | A | * | 9/1985 | Baines ............................. 383/21 |
| 4,550,439 | A | * | 10/1985 | Peppiatt et al. ................ 383/28 |
| 4,573,203 | A | * | 2/1986 | Peppiatt ........................ 383/29 |
| 4,854,733 | A | | 8/1989 | Schwinn |
| 4,867,575 | A | * | 9/1989 | Wood ............................. 383/17 |
| 4,874,255 | A | * | 10/1989 | Ball et al. ......................... 383/8 |

(Continued)

FOREIGN PATENT DOCUMENTS

| | | |
|---|---|---|
| JP | 2003 312728 A1 | 11/2003 |
| WO | WO 2010/062231 A1 | 6/2010 |

OTHER PUBLICATIONS

PCT International Search Report, dated Nov. 22, 2013, 11 pages.

*Primary Examiner* — Peter Helvey
(74) *Attorney, Agent, or Firm* — Sarah M. DeCristofaro; Abbey A. Lopez (57) ABSTRACT

A flexible package being capable and being adapted for accommodating a multiplicity of absorbent articles. The package has a substantially parallelepiped-shape and further comprises a frame. The frame is completely surrounding the top gusset extending upwardly and substantially orthogonally from the top gusset. The flexible package also comprises a handle extending over the top gusset. It is a further object of the present invention to provide a method of manufacturing a flexible package.

9 Claims, 9 Drawing Sheets

(56) References Cited

U.S. PATENT DOCUMENTS

| | | | | |
|---|---|---|---|---|
| 4,877,335 | A * | 10/1989 | Barnard | 383/6 |
| 4,934,535 | A * | 6/1990 | Muckenfuhs et al. | 206/494 |
| 4,966,286 | A * | 10/1990 | Muckenfuhs | 206/494 |
| 5,036,978 | A * | 8/1991 | Frank et al. | 206/494 |
| 5,059,034 | A * | 10/1991 | Schulz et al. | 383/21 |
| 5,112,138 | A * | 5/1992 | Peppiatt | 383/29 |
| 5,121,995 | A * | 6/1992 | Newman et al. | 383/29 |
| 5,158,368 | A * | 10/1992 | Lichtwardt et al. | 383/21 |
| 5,174,657 | A * | 12/1992 | Peppiatt | 383/8 |
| 5,282,687 | A * | 2/1994 | Yee | 383/25 |
| 5,427,245 | A | 6/1995 | Roussel | |
| 5,464,285 | A * | 11/1995 | Anderson | 383/10 |
| 5,722,774 | A * | 3/1998 | Hartz | 383/207 |
| 7,866,473 | B2 * | 1/2011 | Clark et al. | 206/494 |
| 8,157,095 | B2 * | 4/2012 | Motsch | 206/494 |
| 8,490,793 | B2 * | 7/2013 | Evenson et al. | 206/494 |
| 8,584,855 | B2 * | 11/2013 | Ito et al. | 206/494 |
| 8,961,012 | B2 * | 2/2015 | Martin et al. | 383/10 |
| 2004/0022462 | A1 * | 2/2004 | Markham | 383/207 |

* cited by examiner

FLEXIBLE PACKAGE AND METHOD OF MAKING SAME

FIELD OF THE INVENTION

The present invention relates to a flexible package capable of receiving and holding products, such as disposable absorbent articles. More particularly, the present invention relates to a flexible package having a frame with a handle attached to the inner part of the frame to provide a more stable container. The present invention also relates to a method for making such a flexible package.

BACKGROUND OF THE INVENTION

Flexible packages are composed of flexible material such as a plastic film. Their use for packaging products such as disposable absorbent articles, e.g. diapers, as well as feminine hygiene products, e.g. sanitary napkins is well known in the art.

The flexible package facilitates storage of the products, transportation and display on the shelves.

The flexible package has front and rear walls which are connected to each other (e.g. sealed) along side edge regions thereof. The flexible packages are filled by entering the products from the bottom, after which the bottom region is closed by means of, for example, sealing. The flexible package may also include a handle to facilitate the carrying of the package. The products may be removed from a top opening.

Often, when the user removes the products from the top opening, the flexible package suffers from a lack of stability and collapses.

There is hence a need to provide a flexible package with improved stability such that upon opening, the overall shape of the flexible package is sustained.

There is further a need to provide a flexible package with improved pallet stability.

There is also a need to provide a flexible package with improved stability such that upon lifting, the handle is prevented to be torn off from the rest of the package.

SUMMARY OF THE INVENTION

It is an object of the present invention to provide a flexible package being capable and being adapted for accommodating a multiplicity of articles such as compressed absorbent articles (e.g. disposable diapers). The package has a substantially parallelepiped-shape comprising: a front wall, a rear wall, opposite sides, a bottom and a top gusset, a first panel wherein the first panel forming the front wall, a portion of each of the opposite sides and a portion of the bottom, a second panel wherein the second panel forming the rear wall, a portion of each of the opposite sides and a portion of the bottom, wherein the first and the second panel are connected to each other at the two opposite sides along first and second side seams, and third panel wherein the third panel forming the top gusset.

The flexible package further comprises a frame having an outer layer which consists of portions of the first and second panels, an inner layer which consists of a portion of the third panel, an upper edge forming a boundary between a portion of the first and third panels and between a portion of the second and third panels, and a lower edge. The frame is completely surrounding the top gusset extending upwardly and substantially orthogonally from the top gusset.

The flexible package also comprises a handle extending over the top gusset, having an inner surface, an outer surface and two opposite end edges. Each of the two opposite end edges of the handle extends from first to second seams respectively. The handle is attached to the frame at or adjacent to its two opposite end edges such that the outer surface of the handle is in direct contact with the inner layer of the frame. The handle is attached to the frame by a seal, wherein the seal joins the handle, the inner layer and the outer layer of the frame together and wherein the seal forms the lower edge of the frame.

It is a further object of the present invention to provide a method of manufacturing a flexible package comprising a front wall, a rear wall, opposite sides, a bottom and a top gusset, a first panel, the first panel forming the front wall, a portion of each of the opposite sides and a portion of the bottom, a second panel, the second panel forming the rear wall, a portion of each of the opposite sides and a portion of the bottom, wherein the first and the second panel are connected to each other at the two opposite sides along first and second side seams and a third panel, the third panel forming the top gusset. The flexible package further comprises a frame and a handle wherein the handle is attached to the frame by a seal.

The method comprises the steps of:
(a) providing a first film in the form of an endless sheet travelling in machine direction and comprising in a cross machine direction a twofold portion and a fourfold portion, the twofold portion of the first film comprising first and second layers and the fourfold portion of the first film comprising first and second outer layers and first and second inner layers, wherein the first and second outer layers of the fourfold portion are coextensive with the first and second layers of the twofold portion of the first film;
(b) providing a second film in the form of a second endless sheet travelling in machine direction, the second film subsequently forms handles and comprising in cross machine direction a twofold portion, the twofold portion of the second film comprising two layers and having in cross machine direction a lateral folded edge and two free end edges;
(c) introducing the free end edges of the twofold portion of the second film between the first and second inner layers of the fourfold portion of the first film followed by bonding the first layer of the twofold portion of the second film, the first inner layer and the first outer layer of the fourfold portion of the first film together, and bonding the second layer of the twofold portion of the second film, the second inner layer and the second outer layer of the fourfold portion of the first film together for generating the frame;
(d) sealing and cutting the first and second layers of the twofold portion of the first film, the outer and inner layers of the fourfold portion of the first film and the first and second layers of the twofold portion of the second film along a continuous straight line in cross direction to form first and second side seams of the package.

BRIEF DESCRIPTION OF THE DRAWINGS

While the specification concludes with claims particularly pointing out and distinctly claiming the present invention, it is believed that the same will be better understood from the following description read in conjunction with the accompanying drawings in which:

DETAILED DESCRIPTION OF THE INVENTION

Definition of Terms

The term "absorbent article" as used herein refers to devices which absorb and contain body exudates, and, more specifically, refers to devices which are placed against or in proximity to the body of the wearer to absorb and contain the various exudates discharged from the body. Typical absorbent articles of the present invention include but are not limited to diapers, adult incontinence briefs, training pants, diaper holders and liners, absorbent inserts and the like, as well as feminine hygiene products, such as sanitary napkins and panty liners, and the like. Absorbent articles also include wipes, such as household cleaning wipes, baby wipes, and the like.

"Comprise", "comprising", and "comprises" as used herein are open ended terms, each specifying the presence of what follows, e.g., a component, but not precluding the presence of other features, e.g., elements, steps or components known in the art, or disclosed herein.

"Cross Machine Direction" or "CD" as used herein means the direction perpendicular to the machine direction in the same plane of the endless sheet of flexible material comprising the fibrous structure.

"Disposable" as used herein refers to absorbent articles which generally are not intended to be laundered or otherwise restored or reused (i.e., they are intended to be discarded after a single use and, preferably, to be recycled, composted or otherwise discarded in an environmentally compatible manner).

The term "film" as used herein refers to a substantially non-fibrous sheet-like material wherein the length and width of the material far exceed the thickness of the material. Typically, films have a thickness of about 0.5 mm or less.

"Machine Direction" or "MD" as used herein means the direction parallel to the flow of the endless sheet of flexible material through the flexible package making machine and/or product manufacturing equipment.

As used herein the expressions "front", "rear", "lower", "upper", "outer", "inner", "longitudinal", "transversal", "top", "side", "bottom", "outwardly", "inwardly" and the like, when used to describe the flexible package, relate to a filled package placed in a carrying position with the bottom part facing downwards and the top gusset facing upwards, such as e.g. shown in the figures. Some of these terms are also used with respect to the method of manufacturing of the flexible package.

The Flexible Package

Figure 1:
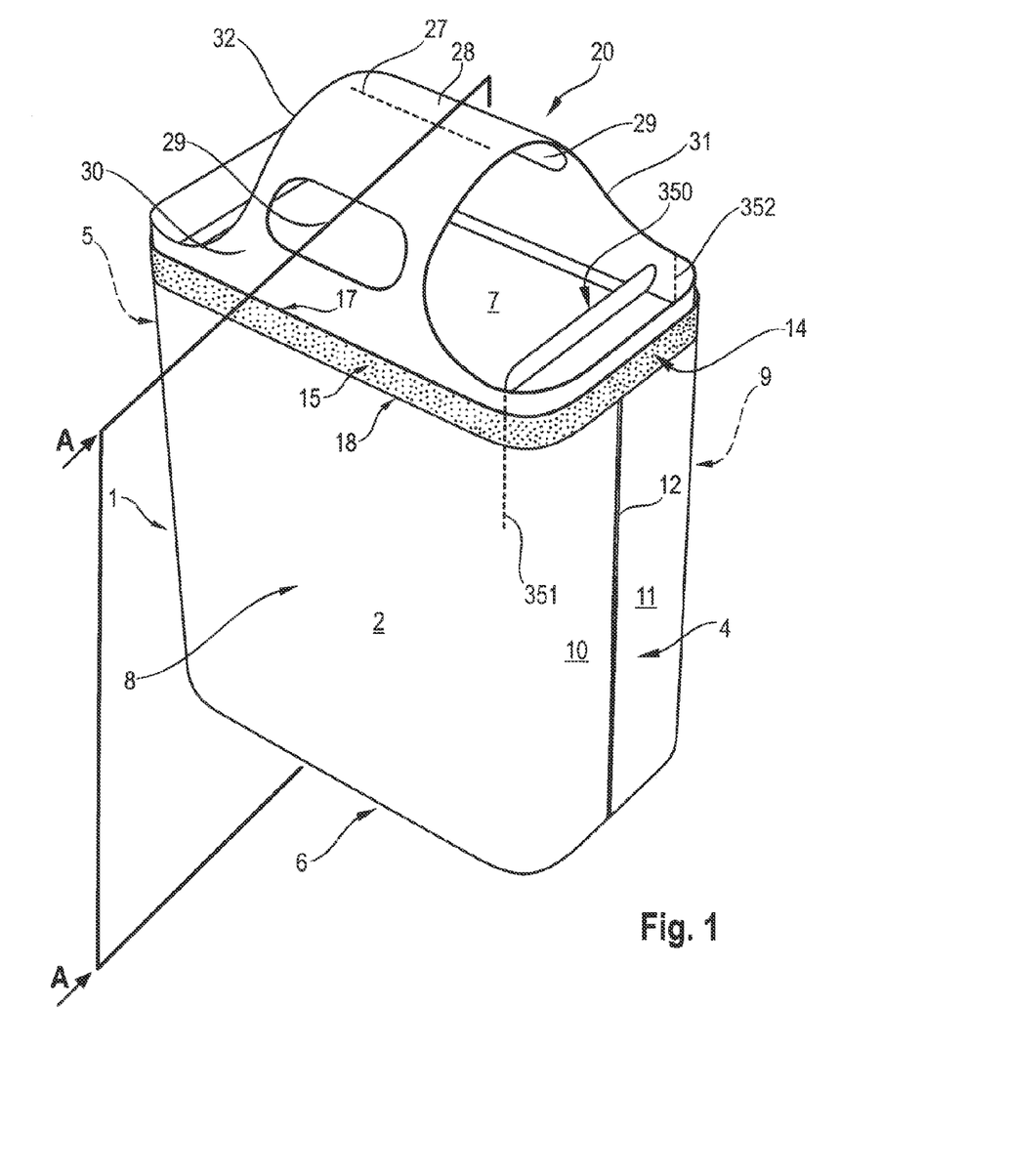
FIG. 1 is a schematic perspective view of a flexible package within the scope of the invention.

FIG. 1 shows a flexible package 1 within the scope of the invention. The flexible package 1 has approximately parallelepiped-shape, i.e. a hexahedron shape.

The flexible package 1 comprises a front wall 2, a rear wall 3 facing the front wall 2, two opposite sides 4, 5, a bottom 6 and a top gusset 7.

Figure 2A:
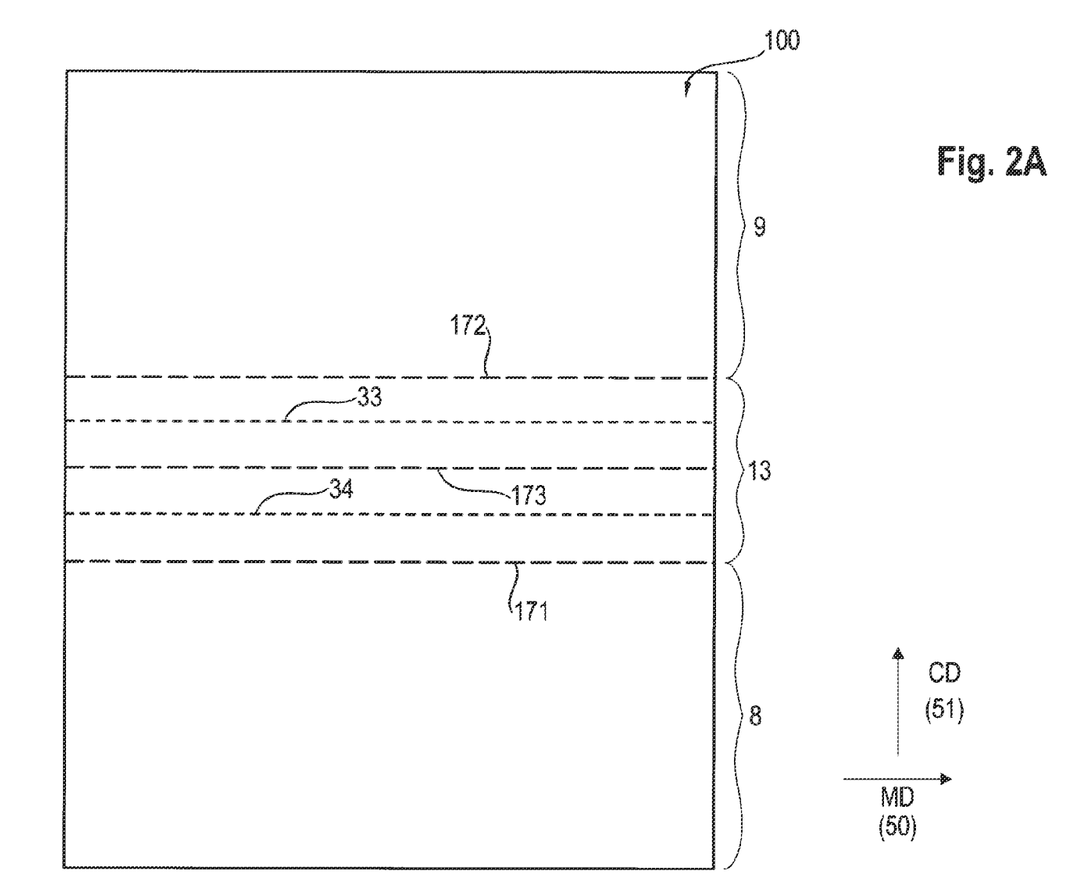
FIG. 2A is a top view of the first, second and third panels of the first film in a flat state, i.e. before any folding has been performed to form the flexible package.

FIG. 2A shows a top view of a first film 100 in a flat state, before any folding has been performed to manufacture and form the flexible package 1. The flexible package 1 comprises a first panel 8. The first panel 8 forms the front wall 2, a portion 10 of each of the opposite sides 4, 5 and a portion of the bottom 6. A second panel 9 forms the rear wall 3, a portion 11 of each of the opposite sides 4, 5 and a portion of the bottom 6. As shown in FIG. 1, the first and the second panels 8, 9 are connected to each other at the two opposite sides 4, 5 along first and second side seams 12. The first and second side seams 12 extend from the bottom 6 of the package 1 to the top of the flexible package 1.

Furthermore, the top gusset 7 is formed by a third panel 13.

The material(s) should be flexible such that the flexible package 1 may assume the parallelepiped-shape when it is filled with articles. The materials should be capable of being deformed to a certain extent, compressed or squeezed without the material being broken.

The flexible package 1 of the present invention may comprise a thermoplastic film or a laminate of more than one thermoplastic films bonded to each other prior to making the flexible package 1. Examples of suitable materials are polyethylene, polypropylene and polyethylene terephtalate.

The flexible package 1 includes a frame 14 as illustrated in FIG. 1. The frame 14 comprises an outer layer 15 which consists of portions of the first and second panel 8, 9. The frame 14 has also an inner layer 16 which consists of a portion of the third panel 13. The outer and inner layers 15, 16 coincide at the upper edge 17 of the frame 14. Indeed, this upper edge 17 forms a boundary between the first and third panels 8, 13 and a boundary between the second and third panels 9, 13, respectively. When making the flexible package 1, the first film 100 in the form of an endless sheet is folded over itself multiple times so as to form a generally M-shaped film. The first film 100 is folded along a first, second and third fold lines 171, 172, 173. In the final package, the first and second fold lines 171, 172 form the upper edge 17 of the frame 14 (as shown in FIG. 2A).

The frame 14 completely surrounds the top gusset 7. From its lower edge 18, the frame 14 extends upwardly and substantially orthogonally from the top gusset 7.

The frame 14 may be printed, pigmented and/or otherwise colored differently compared to the printing and/or pigmentation of the rest of the package to highlight the frame 14 and to indicate the location of top region of the package.

Figure 3:
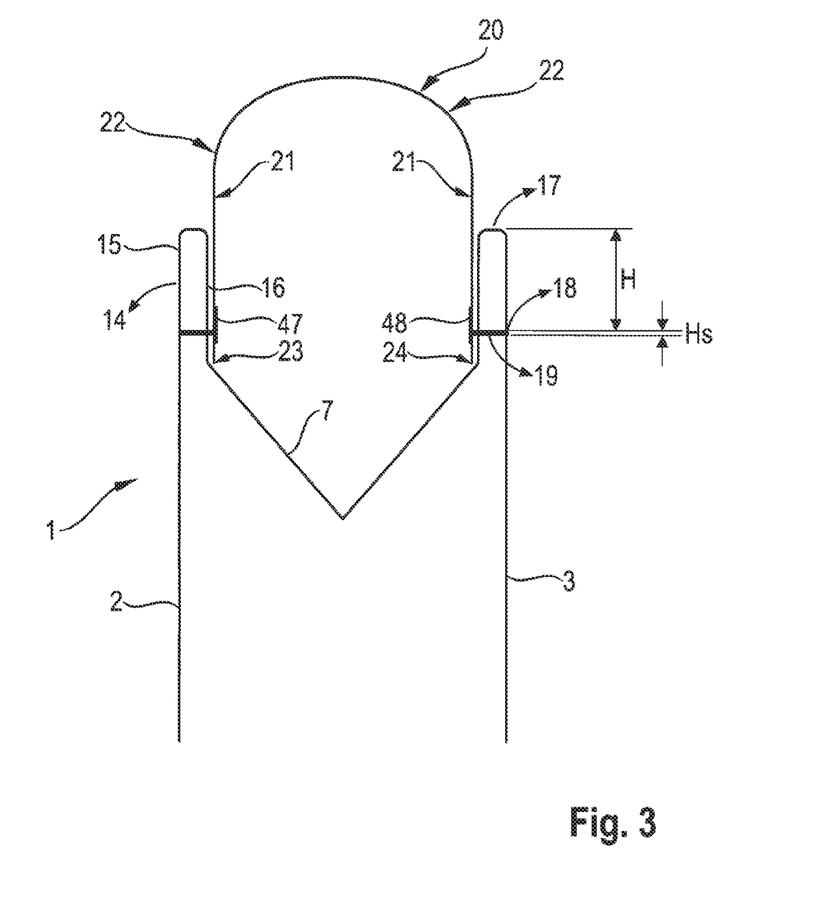
FIG. 3 is a cross-sectional view of the flexible package taken along a cutting plane A-A in FIG. 1.

FIG. 3 is a cross-sectional view of the flexible package taken along a cutting plane A-A in FIG. 1. The flexible package 1 comprises a handle 20. The handle 20 is made of a second film and has an inner surface 21, and an outer surface 22.

The handle 20 is attached to the frame 14 at or adjacent to its two opposite end edges 23, 24 such that the outer surface 22 of the handle 20 is in direct contact with the inner layer 16 of the frame 14. Two opposite end edges 23, 24 of the handle 20 surround the top gusset 7. Each of the two opposite end edges 23, 24 extend from first to second side seams 12 respectively. The attachment of the handle 20 to the frame 14 is facilitated by a seal 19. The seal 19 joins the handle 20 to the inner and outer layers 16, 15 of the frame 14. During the manufacturing, the sealing step forms the frame 14, particularly its lower edge 18 and also attaches the handle 20 to the frame 14.

This particular bonding, wherein the handle 20 is in direct contact with the inner layer 16 of the frame 14 (rather than being in direct contact with the outer layer 15) and both layers of the frame 14 are sealed to the handle 20 provides several advantages:

First, when the flexible package is grasped and lifted, the frame 14 stands up straight and does not bend inwardly towards the top gusset 7.

The risk of tearing off the handle 20 from the remaining package at the seal upon lifting of the flexible package 1 is also reduced.

Secondly, when several packages are stacked on top of each other, pallet stability is improved because the handle 20 is folded onto the top gusset 7 without adversely affecting the frame 14, i.e. the frame 14 will not fold onto the top gusset 7. The frame 14 of a first package can thus serve as a "receiver" for the bottom 6 of a second upper package placed on top of the first one "into" the frame of lower package.

The handle 20 is made of a second film which during the manufacturing of the flexible package 1, is folded such that the inner surfaces of each end edge 23, 24 are in direct contact with each other. There is therefore a risk that these areas of the inner surface are sealed together during the sealing step where the handle 20 is attached to the frame 14.

In the portion of the handle 20 adjacent to its end edges 23, 24, which is sealed to the frame 14, the inner surface 21 of the handle 20 may be treated with an anti-seal varnish and/or coated with a polymer material.

The handle 20 can be made of a thermoplastic polymer material. The handle 20 may be treated with an anti-seal varnish, which is a chemical composition printed or otherwise applied on the inner surface 21 of the handle 20. This anti-seal varnish has a melting point above the melting point of the material in which the handle 20 is made.

The inner surface 21 of the handle 20 may be coated with another polymer material ("polymer coating") having a melting point above the sealing temperature at which the first film 100 is attached to the second film 200 (i.e. the handle 20). During the sealing step when the handle 20 is attached to the frame 14, a portion of the inner surface 21 on or adjacent to at least one of the free end edges 23, 24 of the handle 20 can thus be prevented from being sealed together because the polymer coating does not melt at the sealing temperature.

For instance, the handle 20 can be made of a low-density polyethylene having a melting point from 105 to 115° C. The inner surface 21 of the handle 20 may be thus coated with polyethylene terephtalate, which has a melting point of 260° C.

Typically, the difference between the melting point of the anti-varnish seal or the polymer material and the handle material should be at least 20° C., or at least 40° C., or at least 60° C.

The handle 20 may be made of a material which is a composition, co-extruded multilayer films or laminate of more than one thermoplastic polymer material. The anti-varnish seal or the polymer material for the coating may also be made of a material which is a composition or laminate of more than one ingredient mixed.

In case of a composition, the difference in temperature between the melting point of the composition in which the anti-varnish seal or the polymer material is made and the melting point of the composition in which the handle 20 is made, should be at least 20° C., or at least 40° C., or at least 60° C.

In case of co-extruded multilayer films or laminate materials, the difference in temperature between the lowest melting point between the materials in which the anti-varnish seal or the polymer material is made and the lowest melting point between the laminated thermoplastic polymer materials in which the handle 20 is made, should be at least 20° C., or at least 40° C., or at least 60° C.

As shown in FIG. 3, the frame 14 has a height (H) extending between the upper edge 17 and the lower edge 18 of the frame 14. The height (H) of the frame 14 may be from 5 mm to 50 mm, or from 5 mm to 25 mm, or from 5 mm to 10 mm.

The seal also has a height (Hs). The height (Hs) of the seal 19 may be from 1.0 mm to 25 mm, or from 1.0 mm to 10 mm, or from 1.0 mm to 5 mm. The ratio between H/Hs is at least 5 up to 20.

Figure 4:
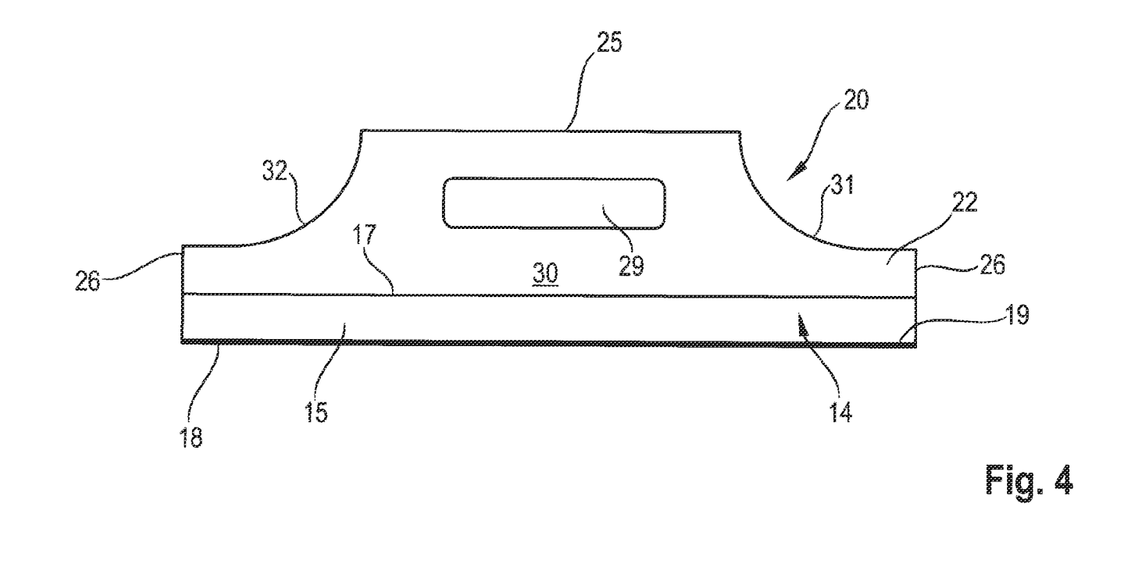
FIG. 4 is a side view of the handle attached to the frame of the flexible package, in a flat state, only showing the handle and the frame.

FIG. 4 is a side view which only shows the handle 20 attached to the frame 14 in a flat state while the remaining parts of the flexible package are omitted from the view.

The handle 20 may comprise a longitudinal centerline which divides the handle 20 into two equal handle portions 30. Each handle portion 30 is attached to the frame 14 at and/or adjacent to its respective free end edges 23, 24.

The handle 20 may be provided with one or more opening 29 in order to grasp and lift the flexible package 1. The openings 29 may be large enough to enable a consumer to move one or more fingers, or even the arm through the openings 29 to enable comfortable grasping and lifting of the flexible package 1.

The handle 20 may include a line of weakness 27. The line of weakness 27 is configured such as to allow tearing apart the handle 20 to enable easy access to the top gusset 7.

Furthermore, the line of weakness 27 may be provided along the longitudinal centerline of the handle 20 (as shown in FIG. 1). When the handle 20 is torn off at this line of weakness 27, the handle 20 may be split into the two equal handle portions 30. One opening 29 may be located on each side of the line of weakness 27.

Thereby, the consumer has access to the top opening but in addition, the handle 20 can still be used to comfortably carry the flexible package 1, e.g. by using the openings 29.

The handle 20 further may have side cutouts 31, 32. The side cutouts 31, 32 of the handle 20 may have an arcuate shape and extend from the longitudinal centerline towards one of the first and second side end edges 26 of the handle 20.

The side cutouts 31, 32 of the handle 20 may enable the user to hold the flexible package 1 by passing his arm through the two side cutouts 31, 32 of the handle 20.

The flexible package 1 also comprises a top opening in the top gusset 7, which includes lines of weakness 33, 34, 350, to enable the user to easily open and remove articles from the flexible package 1.

Figure 2B:
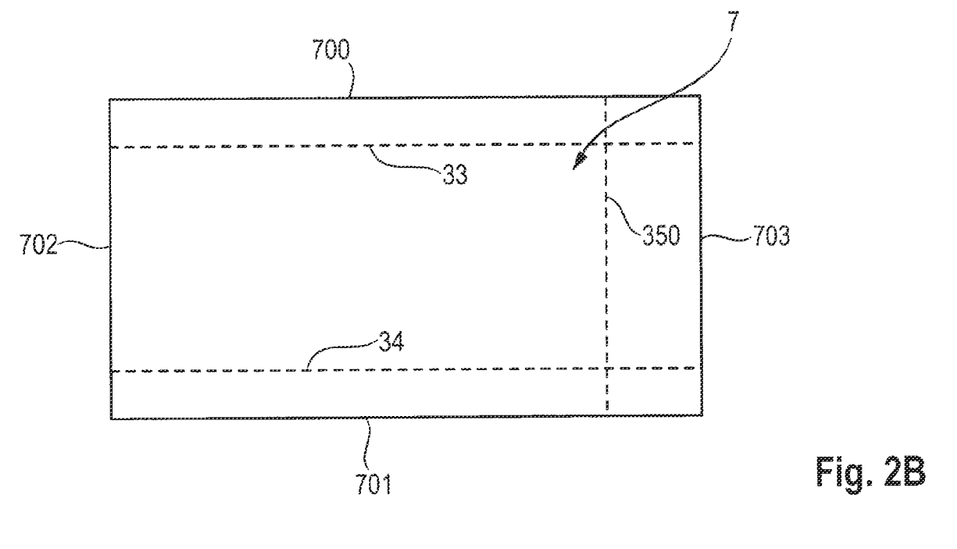
FIG. 2B is a top view of the perforated top gusset of the first film in a flat state.

The top gusset 7 has first and second longitudinal edges 700, 701 and first and second transversal edges 702, 703 as exemplary shown in FIG. 2B.

At least a portion of a first line of weakness 33 may be provided substantially parallel and adjacent to the first longitudinal edge 700 of the top gusset 7.

At least a portion of a second line of weakness 34 may be provided substantially parallel and adjacent to the second longitudinal edge 701 of the top gusset 7.

The first and second lines of weakness 33, 34 may both have portions which are non-parallel to the first and second longitudinal edges 700, 701 of the top gusset 7. In such embodiments, the first and second lines of weakness 33, 34 converge at each of the first and second side seams 12.

A third line of weakness 350 may be adjacent to one of the transversal edges of the top gusset 7, e.g. the transversal edge 703 of the top gusset 7 in FIG. 2. The third line of weakness 350 may be substantially perpendicular to the first and second longitudinal edges 700, 701 of the top gusset 7. The third line of weakness 350 connects the first and second lines of weakness 33, 34, which together form a tearing means for the top opening in the top gusset 7.

In the package shown in FIG. 1, a part of the top gusset 7, defined by the first, second and third lines of weakness 33, 34, 350 has been pulled open. The frame 14 and consequently the shape of the flexible package 1 remain unaffected because the lines of weakness 33, 34, 350 do not rupture the frame. The user is enabled to remove the articles easily one by one from the top opening of the flexible package 1, while the frame 14 provides improved stability and integrity to the package.

The part of the top gusset 7 that was pulled open may be covered again by the flexible packaging material by letting the portion that was pulled open fall back onto the top gusset 7.

However, if only few articles are left in the flexible package 1, some consumers may find it slightly inconvenient to remove the remaining articles via the top opening. Hence, the flexible package 1 may be provided with means to access the content of the flexible package 1 from a side of the package (as shown in FIG. 1).

The flexible package may comprise a fourth and fifth lines of weakness 351 and 352. The fourth line of weakness 351 may extend from the front wall 2 through the outer and inner layers 15, 16 of the frame 14 and through the handle 20 into the top gusset 7.

The fifth line of weakness 352 may extend from the rear wall 3 through the outer and inner layers 15, 16 of the frame 14 and through the handle 20 into the top gusset 7.

The fourth and fifth lines of weakness 351, 352 may be substantially perpendicular to the upper edge 17 of the frame 14. They are connected to each other by the third line of weakness 350.

The fourth and fifth lines of weakness 351, 352 made respectively at the front and rear walls 2, 3 enable the user to tear off the package at the side 4 of the package to provide a convenient side opening for the last remaining articles located at the bottom of the package. Only at this stage of usage by the consumer, the frame integrity is no longer maintained because the fourth and fifth lines of weakness 351, 352 are extending through the outer and inner layers 15, 16 of the frame 14.

A Method of Manufacturing the Flexible Package

A method for producing flexible packages by automated machinery will now be briefly described. FIGS. 5 and 6A to 6C schematically illustrate a possible way of manufacturing the flexible package 1. The manufacture of the flexible package 1 may start from a first film 100 in the form of an endless sheet travelling in machine direction 50. The first film 100 forms the package body, i.e. all the parts of the package with the frame 14 except for the handle 20. A second film 200 in the form of an endless sheet forms the handle 20. These two films are utilized for producing flexible packages 1. Both the first and second films 100, 200 are constituted by any of the above described thermoplastic films.

Folding of the First Film

The first film 100 as shown for instance in FIG. 2 comprises first, second and third fold lines 171, 172, 173. The first, second and third fold lines 171, 172, 173 extend in machine direction 50. A central region of the first film 100 is delimited by the two outer fold lines 171, 172.

Figure 5:
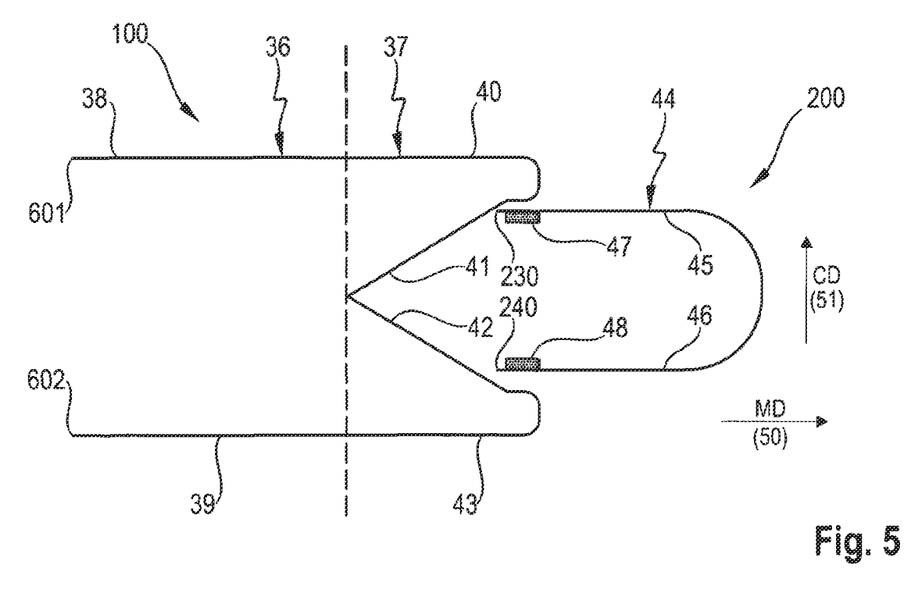
FIG. 5 is a cross-sectional view of the flexible package, after the insertion of the second film in the first film and during the manufacturing process.

The M-shaped folded first film 100 comprises a twofold portion 36 and a fourfold portion 37 which extends in machine direction 50.

The twofold portion 36 of the M-shaped folded first film 100 comprises first and second layers 38, 39. The folded first film 100 has first and second end edges 601, 602 which are at the respective end edges of the first and second layers 38, 39 of the twofold portion 36. The first and second end edges 601, 602 of the twofold portion 36 later on forms a part of the bottom 6 of the flexible package 1.

The first and second layers 38, 39 of the twofold portion 36 of the first film 100 form respectively a portion of the bottom 6, a portion of the front wall 2, a portion of the bottom 6 and a portion of the rear wall 3.

The fourfold portion 37 of the M-shaped folded first film 100 comprises first and second outer layers 40, 43. The first and second outer layers 40, 43 are coextensive with the first and second layers 38, 39 of the twofold portion 36 of the first film 100.

The fourfold portion 37 further comprises first and second inner layers 41, 42 which are sandwiched between the first and second outer layers 40, 43. The first and second inner layers 41, 42 mutually merge at the third fold line 173 not represented in FIG. 5. Each inner layer 41, 42 merges into the respective adjacent outer layer 40, 43 at the respective first and second fold lines 171, 172.

The first and second outer layers 40, 43 form respectively a portion of the front wall 2 of the flexible package 1, a portion of the outer layer 15 of the frame 14, a portion of the rear wall 3 of the flexible package 1 and a portion of the outer layer 15 of the frame 14.

The first and second inner layers 41, 42 form the top gusset 7 and each of them, respectively a portion of the inner layer 16 of the frame 14.

Folding of the Second Film

A second film 200 is provided in the form of a second endless sheet travelling in machine direction 50. The second film 200 has a longitudinal axis parallel to the machine direction 50. The second film 200 subsequently forms the handles 20. The second film 200 is folded such that it comprises in cross machine direction 51 a twofold portion 44.

The twofold portion 44 of the second film 200 comprises first and second layers 45, 46 and has in cross machine direction 51 a lateral folded edge 25 and two free end edges 230, 240 which are overlaying each other.

Prior to folding the second film 200, a portion at or adjacent to at least one of the free end edges 230, 240 of the second film 200 may be treated with an anti-seal varnish and/or coated with a polymer material having a melting point above the temperature of the following sealing step wherein the first film 100 is sealed to the second film 200. The anti-seal varnish and/or the coating with the polymer material is applied on the surface of the film 200 which after folding forms the inwardly facing surfaces of the first and second layers 45, 46 the second film 200. Typically, the difference between the melting point of the anti-varnish seal or the polymer material and the material of the second film 200 should be at least 20° C. or at least 40° C., or at least 60° C.

As a result after folding, a portion 47 of the inwardly facing surface of the first layer 45 and/or a portion 48 of the inwardly facing surface of the second layer 46 may have been treated in order to prevent sealing of the first and second layers 45, 46 of the twofold portion 44 of the second film 200 to each other.

Thereafter, the second film 200 is folded over on itself along its longitudinal axis such that the lateral folded edge 25 and the free edges 45, 46 are formed. The area around the folded edge 25 later on forms the central region 28 of each respective handle 20.

Sealing of the Second Film to the First Film: Formation of the Frame

Figure 6A:
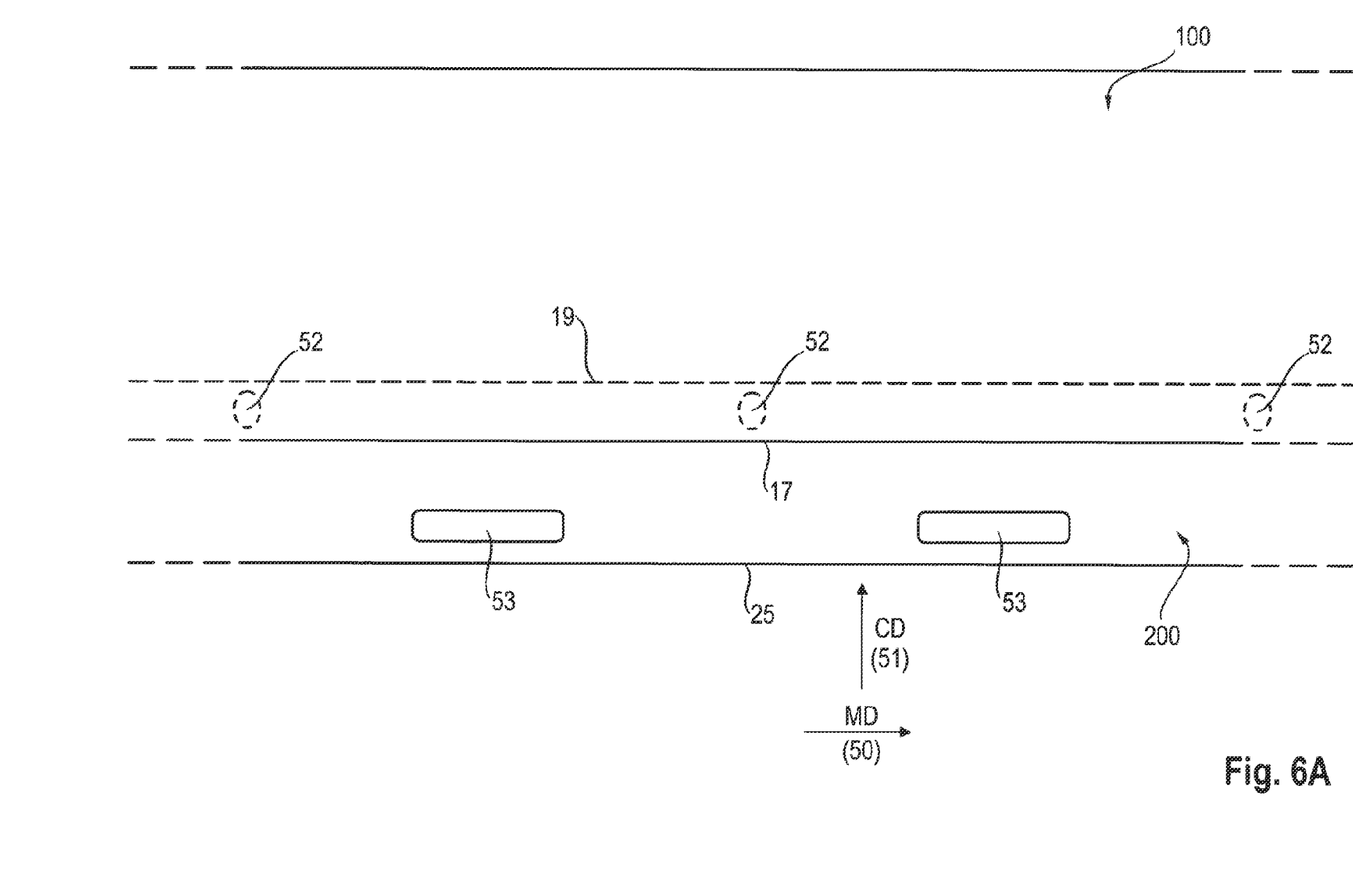
FIG. 6A is a front view of two flexible packages during manufacturing from endless sheets.

The first and second films 100, 200 are connected with each other (shown in FIGS. 5 and 6).

The free end edges 230, 240 of the twofold portion 44 of the second film 200 are inserted between the first and second inner layers 41, 42 of the fourfold portion 37 of the first film 100.

Thereafter, the formation of the frame 14 and the attachment of the handle 20 to the package body are obtained by bonding the first layer 45 of the twofold portion 44 of the second film 200 to the first inner layer 41 and to the first outer layer 40 of the fourfold portion 37 of the first film 100. Simultaneously, the second layer 46 of the twofold portion 44 of the second film 200 is bonded to the second inner layer 42 and to the second outer layer 43 of the fourfold portion 37 of the first film.

The bonding may be achieved, e.g. by adhesive bonding, pressure bonding as well as by means of thermal bonding or ultrasonic bonding, especially when the flexible package 1 is made of thermoplastic material and combinations thereof (e.g. thermal and pressure bonding).

Final Sealing and Cutting

The first and second layers 38, 39 of the twofold portion 36 of the first film 100 are sealed to the outer and inner layers 40, 41, 42, 43 of the fourfold portion 37 of the first film 100 as well as to the first and second layers 45, 46 of the twofold portion 44 of the second film 200. The first and second layers 38, 39 of the twofold portion 36 of the first film 100 sealed to the outer and inner layers 40, 41, 42, 43 of the fourfold portion 37 of the first film 100 as well as to the first and second layers 45, 46 of the twofold portion 44 of the second film 200 are simultaneously cut in the area where they are sealed.

The sealing and cutting step is performed along a continuous straight line in cross direction 51, which results in the formation of the two opposite side seams 12 of the flexible package 1.

Perforations of the First Film

Prior any folding of the first film, first and second lines of weakness 33, 34 may be introduced in the central region of the first film 100. The first line of weakness 33 is substantially parallel and adjacent to the first fold line 171. The second line of weakness 34 is substantially parallel and adjacent to the second fold line 172.

The first and second lines of weakness 33, 34 extend substantially along machine direction 50 continuously along the length of the first film 100. The first line of weakness 33 is substantially parallel to the second line of weakness 34.

Perforations of the Second Film

Prior any folding of the second film 200, a line of weakness 27 may be introduced in machine direction 50 at or adjacent to the longitudinal axis of the second film 200 in order to render the handle 20 splittable. The line of weakness 27 is provided on the second film 200 along a longitudinal centerline which divides the second film 200 into two portions.

Perforations of the First and Second Films

Figure 6B:
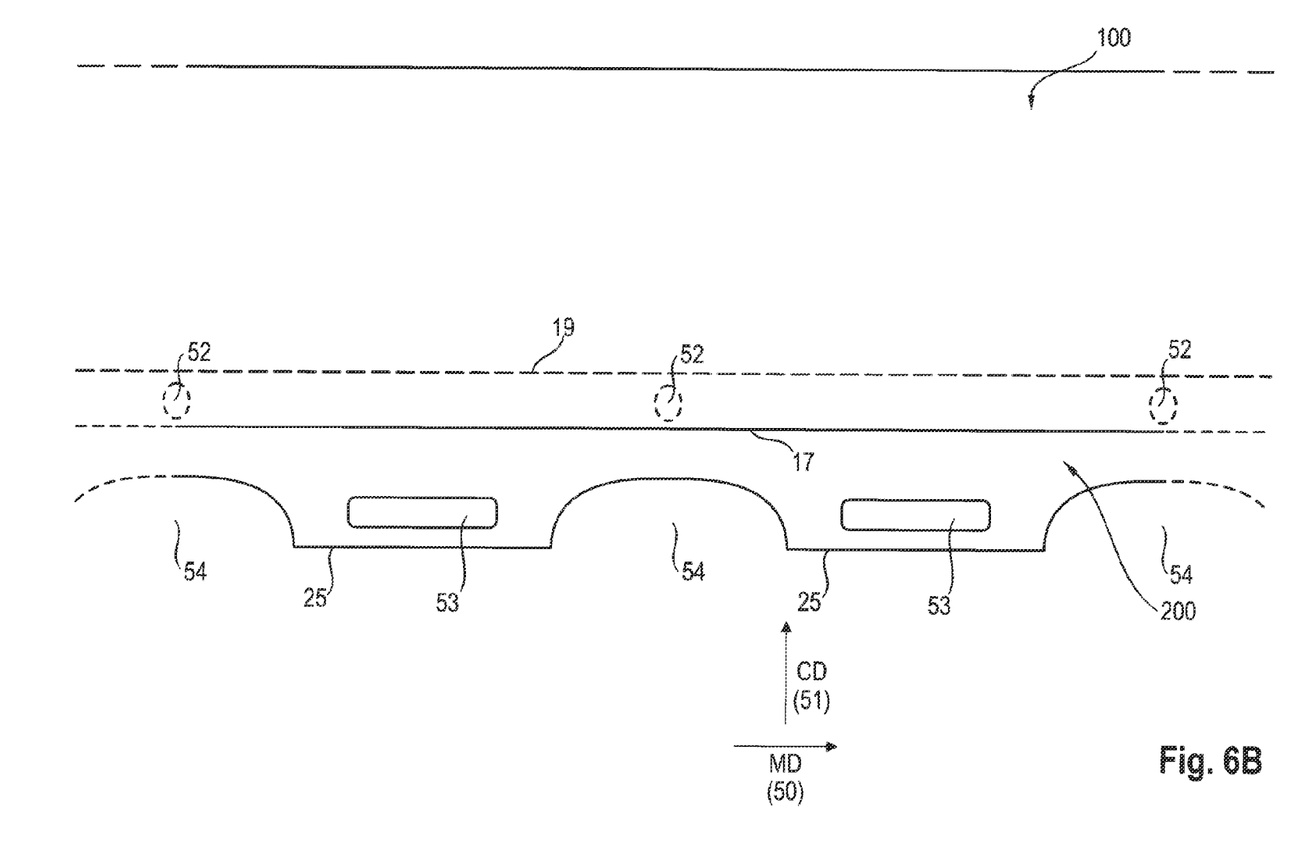
FIG. 6B is a front view of two flexible packages during manufacturing from endless sheets after arcuate cutouts in the second film.
Figure 6C:
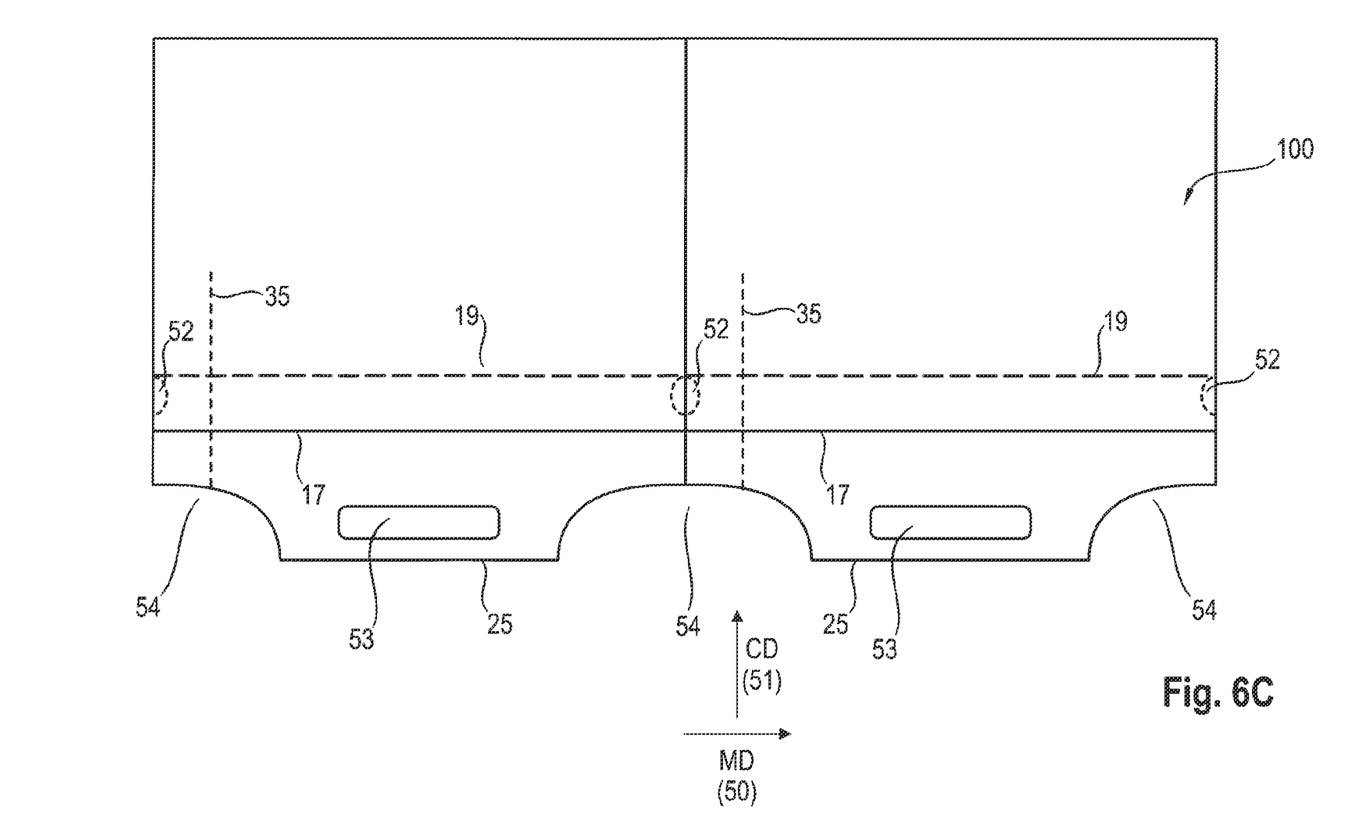
FIG. 6C is in a front view of two flexible packages during manufacturing after formation of the side seams.

Furthermore, the third, fourth and fifth lines of weakness 350, 351, 352 in the flexible package 1 correspond to a third line of weakness 35 for the manufacture of the flexible package 1 (as shown in FIG. 6C). The third line of weakness 35 may be introduced in cross machine direction 51 and extend through the layers 45, 46 of the second film 200, the layers 40, 41, 42, 43 of the fourfold portion 37 of the first film 100, and through a portion of the first and second layers 38, 39 of the twofold portion 36 of the first film 100.

Hence, the third, fourth and five lines of weakness 350, 351, 352 of the flexible package 1 as described above for the flexible package 1 are obtained with one single perforation.

Cutting

Prior any folding of the second film 200, successive optional zones 52 may be removed at or adjacent to each free end edge 230, 240 of the second film 200, where the optional anti-seal varnish or the optional polymer coating is deposited and where the first and second side seams 12 will be formed. The optional zones 53 may take any shape such as elliptical, round or rectangular shapes.

A portion of the second film 200 comprising either the optional anti-seal varnish or the optional polymer coating deposited on the portions 47, 48 of the first and second layers 45, 46 of the second film 200 is therefore removed. Consequently, in the area where the material of the second film 200 has been removed, only the first and second layers 38, 39 of the twofold portion 36 of the first film 100 are sealed and cut simultaneously with the outer and inner layers 40, 41, 42, 43 of the fourfold portion 37 of the first film 100 (as shown in FIGS. 6A and 6C). As a result, a continuous side seam 12 from the bottom 6 of the flexible package 1 until the upper edge of the handle 20 is obtained. Otherwise, the side seam 12 would be discontinued because the side seam 12 could not be formed at the location where the anti-seal varnish or the polymer coating is deposited.

During the manufacturing, after the second film 200 has been folded, openings 53 may be introduced in both first and second layer 45, 46 of the second film 200. The openings 53 may be equidistant to the lateral folded edge 25 (as shown in FIG. 6A). These openings 53 will allow the user to grasp and lift each flexible package 1.

Cutouts 54 in the second film 200 may be formed (as shown in FIG. 6B). The cutouts 54 correspond to the side cutouts 31, 32 of the handle 20. On both layers 45, 46 of the second film 200, the cutting out areas 54 extend from the lateral folded edge 25 of the twofold portion 44 of the second film 200 along a substantially arcuate path downwards towards the area where the first and second side seams 12 are formed and subsequently along a substantially arcuate path upwards towards the lateral folded edge 25.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A flexible package for accommodating a multiplicity of compressible articles, having a substantially parallelepiped-shape comprising:
   a front wall, a rear wall, opposite sides, a bottom and a top gusset;
   a first panel, the first panel forming the front wall, a portion of each of the opposite sides and a portion of the bottom;
   a second panel, the second panel forming the rear wall, a portion of each of the opposite sides and a portion of the bottom,
   wherein the first and the second panels are connected to each other at the two opposite sides along first and second side seams;
   a third panel, the third panel forming the top gusset;
   a frame comprising:
      an outer layer which consists of portions of the first and second panels;
      an inner layer which consists of a portion of the third panel;
      an upper edge forming a boundary between a portion of the first and third panels and between a portion of the second and third panels; and
      a lower edge defined by a seal,
      wherein the upper edge is separated from the lower edge by a height, wherein the height is greater than a height of the seal,
      wherein the frame is completely surrounding the top gusset extending upwardly and substantially orthogonally from the top gusset; and
   a handle extending over the top gusset, the handle comprising:
      an inner surface;
      an outer surface;
      a first end edge and a second end edge opposite the first end edge; and
      a central region between the first end edge and the second end edge, wherein the central region extends from the upper edge of the frame in a direction away from the top gusset;
      wherein the handle is attached to the frame at or adjacent to its two opposite end edges such that the outer surface of the handle is in direct contact with the inner layer of the frame, the handle being attached to the frame by the seal, wherein the seal joins a portion of the handle adjacent to the two opposite end edges, the inner layer, and the outer layer of the frame together.

2. The flexible package of claim 1, wherein the height of the frame is from about 5 mm to about 50 mm, or from about 5 mm to about 25 mm or from about 5 mm to about 10 mm.

3. The flexible package of claim 2, wherein the height of the seal is from about 1.0 mm to about 25 mm, or from about 1.0 mm to about 10 mm or from about 1.0 mm to about 5 mm, wherein the ratio H/Hs is at least about 5.

4. The flexible package of claim 1, wherein the handle comprises one or more openings in order to grasp and lift the flexible package.

5. The flexible package of claim 1, wherein a line of weakness is provided along a longitudinal centerline of the handle, wherein two openings are located on each side of the line of weakness, the line of weakness divides the handle in two handle portions.

6. The flexible package of claim 1, wherein, in the portion of the handle which is sealed to the frame, the inner surface of the handle is treated with an anti-seal varnish or coated with a polymer material, the anti-seal varnish or the polymer material melts at a temperature above the melting point of the material in which the handle is made.

7. The flexible package of claim 1, wherein the top gusset has first and second longitudinal edges and first and second transversal edges and comprises
   a first line of weakness, at least a portion of the first line of weakness being substantially parallel and adjacent to the first longitudinal edge of the top gusset;
   a second line of weakness, at least a portion of the second line of weakness being substantially parallel and adjacent to the second longitudinal edge of the top gusset;
   a third line of weakness adjacent to the first or second transversal edge of the top gusset, the third line of weakness being substantially perpendicular to the first and second longitudinal edges of the top gusset and the third line of weakness connecting the first and second lines of weakness.

8. The flexible package of claim 7, wherein
   a fourth line of weakness is extending from the front wall through the outer and inner layers of the frame and through the handle into the top gusset,
   a fifth line of weakness is extending from the rear wall through the outer and inner layers of the frame and through the handle into the top gusset and
   the fourth and fifth lines of weakness are connected to each other by the third line of weakness.

9. The flexible package of claim 1, wherein the top gusset having a first longitudinal edge, a second longitudinal edge opposite the first longitudinal edge, a longitudinal fold between the first and second longitudinal edges, a first transversal edge, and a second transversal edge opposite the first transversal edge, the top gusset comprising:
   a first line of weakness, at least a portion of the first line of weakness being substantially parallel and adjacent to the first longitudinal edge of the top gusset, wherein the first line of weakness is positioned between the first longitudinal edge and the longitudinal fold;
   a second line of weakness, at least a portion of the second line of weakness being substantially parallel and adjacent to the second longitudinal edge of the top gusset, wherein the second line of weakness is positioned between the second longitudinal edge and the longitudinal fold;
   a third line of weakness adjacent to the first or second transversal edge of the top gusset, the third line of weakness being substantially perpendicular to the first and second longitudinal edges of the top gusset and the third line of weakness connecting the first and second lines of weakness.

* * * * *